United States Patent
Veine et al.

(10) Patent No.: US 6,767,064 B2
(45) Date of Patent: Jul. 27, 2004

(54) TRANSLATABLE HEAD RESTRAINT FOR AUTOMOTIVE SEAT BACKREST

(75) Inventors: Eric C. Veine, Madison Heights, MI (US); Thomas J. Fowler, Clarkston, MI (US); James C. Mulvihill, Birmingham, MI (US)

(73) Assignee: Lear Corporation, Southfield, MI (US)

( * ) Notice: Subject to any disclaimer, the term of this patent is extended or adjusted under 35 U.S.C. 154(b) by 2 days.

(21) Appl. No.: 10/083,827

(22) Filed: Feb. 27, 2002

(65) Prior Publication Data

US 2003/0160481 A1 Aug. 28, 2003

(51) Int. Cl.⁷ .................................................. A47C 1/10
(52) U.S. Cl. ...................................... 297/391; 297/406
(58) Field of Search ............................ 297/391, 406; 74/500.5, 501.6, 502, 502.2

(56) References Cited

U.S. PATENT DOCUMENTS

| | | | |
|---|---|---|---|
| 1,471,168 A | | 10/1923 | Katz |
| 2,973,029 A | | 2/1961 | Schlosstein |
| 3,420,572 A | | 1/1969 | Bisland |
| 3,680,912 A | | 8/1972 | Matsuura |
| 3,838,870 A | | 10/1974 | Hug |
| 3,885,831 A | * | 5/1975 | Rasmussen .................. 297/410 |
| 4,113,310 A | * | 9/1978 | Kapanka ...................... 297/408 |
| 4,278,291 A | | 7/1981 | Asai |
| 4,720,146 A | | 1/1988 | Mawbey et al. |
| 4,733,913 A | * | 3/1988 | Tateyama ..................... 297/409 |
| 4,762,367 A | | 8/1988 | Denton |
| 4,778,218 A | * | 10/1988 | Suman ......................... 297/391 |
| 4,856,848 A | | 8/1989 | O'Sullivan et al. |
| 5,378,043 A | | 1/1995 | Viano et al. |
| 5,458,396 A | | 10/1995 | Rost |
| 5,664,841 A | * | 9/1997 | Dal Monte .................. 297/408 |
| 5,694,320 A | | 12/1997 | Breed |
| 5,823,619 A | | 10/1998 | Heilig et al. |
| 5,833,312 A | | 11/1998 | Lenz |
| 5,842,738 A | | 12/1998 | Knoll et al. |
| 5,882,071 A | | 3/1999 | Fohl |
| 5,906,414 A | | 5/1999 | Rus |
| 5,961,182 A | | 10/1999 | Dellanno |
| 6,045,181 A | | 4/2000 | Ikeda et al. |
| 6,079,776 A | | 6/2000 | Breitner et al. |
| 6,082,817 A | | 7/2000 | Muller |
| 6,129,421 A | * | 10/2000 | Gilson et al. ............... 297/408 |
| 6,149,231 A | | 11/2000 | Wustholz |
| 6,149,232 A | | 11/2000 | Meyer |
| 6,213,548 B1 | | 4/2001 | Van Wynsberghe |
| 6,217,117 B1 | | 4/2001 | Weiland |
| 6,265,967 B1 | * | 7/2001 | Okada ......................... 340/432 |
| 6,270,161 B1 | * | 8/2001 | De Filippo .................. 297/410 |
| 6,273,511 B1 | * | 8/2001 | Wieclawski ............... 297/463.1 |
| 6,364,414 B1 | * | 4/2002 | Specht ......................... 297/410 |
| 2002/0043858 A1 | * | 4/2002 | Svantesson et al. ........ 297/391 |
| 2002/0074843 A1 | | 6/2002 | Malsch et al. |

FOREIGN PATENT DOCUMENTS

| | | |
|---|---|---|
| DE | 3 042 802 A1 | 6/1982 |
| EP | 0 974 484 A2 | 5/1999 |
| GB | 2 194 729 A | 3/1988 |
| GB | 2 363 323 A | 12/2001 |
| WO | WO 98/09838 | 3/1998 |

* cited by examiner

*Primary Examiner*—Peter M. Cuomo
*Assistant Examiner*—Sarah C. Burnham
(74) *Attorney, Agent, or Firm*—Bill C. Panagos

(57) ABSTRACT

An occupant seat of a motor vehicle includes a backrest, and a headrest mounted atop the backrest on a pair of posts. The headrest includes a base portion supported by the posts, and an occupant-engaging contact portion that is supported by the base portion for relative translational movement along a pair of tracks defined on the base portion. In response to a suitable control signal, such as the tensioning of a Bowden cable in response to an applied force, the contact portion moves under the control of an articulated linkage against a return spring bias and away from the base portion. The translational movement of the contact portion relative to the base portion serves to control contact surface inclination throughout the range of movement of the contact portion relative to the base portion.

8 Claims, 6 Drawing Sheets

TRANSLATABLE HEAD RESTRAINT FOR AUTOMOTIVE SEAT BACKREST

BACKGROUND OF THE INVENTION

1. Field of the Invention

The invention relates to head restraints forming the upper portion of a vehicle seat backrest that may be deployed, for example, to a relatively-forward position in the event of a rear collision in order to increase vehicle occupant safety.

2. Background Art

The prior art teaches an automotive seat that includes a seat cushion, and a backrest pivotally mounted to the seat cushion so that the backrest may be reclined at a selected angle relative to the seat cushion for comfort. To improve seat comfort, a headrest is often defined on the upper portion of the backrest, for example, by supporting a cushion atop the backrest using a pair of posts that are slidably received in complementary guides defined in the upper portion of the backrest frame.

To reduce the likelihood of an undesirable over-extension of the occupant's cervical vertebra in a rear collision, the prior art teaches pivoting the headrest about a pivot axis positioned somewhat vertically beneath the headrest to a relatively forward position within the vehicle in response to such a rear collision. In this manner, the distance which an occupant's head must otherwise travel before being accelerated through contact with the headrest is reduced. For example, in U.S. Pat. No. 5,378,043, the headrest is pivoted relative to the seat backrest using a lever mechanism coupled to a pressure plate disposed within the backrest beneath its upholstery. When the pressure plate is actuated by occupant inertial forces during a rear collision, the upper portion of the backrest or the headrest-supporting guides pivot about a predetermined axis to bring the headrest to a forward position within the vehicle.

Co-pending U.S. patent application Ser. No. 09/938,416 filed Aug. 23, 2001, which is assigned to the assignee of the invention, alternatively teaches a "clamshell" headrest assembly that includes an angularly-fixed, rearward base portion rigidly mounted atop the backrest on a pair of downwardly-extending posts that are slidably received in the backrest frame. The clamshell headrest assembly further includes a forward, occupant-engaging or "contact" portion that is pivotally mounted to the base portion along the base portion's upper edge. A compression spring operates to bias the lower edge of the contact portion toward the seated occupant, while a spread-lever arrangement operated by a tensioned Bowden cable draws the lower edge of the contact portion back against the base portion. When the occupant exerts a threshold occupant inertial force against a pressure plate disposed within the backrest, the Bowden cable is released to permit the "clamshell" to open, as urged by the compression spring. The lower edge of the headrest's contact portion is thus urged toward the occupant's head.

Significantly, because the contact portion of the headrest advances toward the occupant's head through rotation about its upper edge, the inclination of the headrest's engaging surface similarly changes during such an advance, with the degree of advancement of any particular point on the headrest's engaging surface being inversely related to its relative height above the seat cushion. The uppermost part of the headrest's contact portion (proximate to the pivot axis) remains essentially stationary as the contact portion advances upon release of the tensioned Bowden cable.

In yet another prior art approach, U.S. Pat. No. 6,082,817 teaches a multi-link system for supporting the contact portion of the headrest relative to a fixed base portion. Upon the tensioning of a Bowden cable, for example, using a pyrotechnic charge, the contact portion moves both forwardly and upwardly as the links rotate about respective, parallel-spaced axis. While the use of multiple links can effect a forward movement of the forward part of the headrest without an attendant change in the engaging surface's inclination, the relative height of the engaging surface changes during the deployment, thereby presenting the possibility that the contact portion of the headrest will not achieve a desired engagement with the occupant's head.

SUMMARY OF THE INVENTION

It is an object to provide a head restraint or "headrest" for an automotive seat that features an occupant-engaging contact portion that is displaced, in response to a rear collision, to a maximum forward position relative to a backrest-mounted base portion while otherwise maintaining the nominal height and inclination of the contact portion's occupant-engaging surface.

Another object of the invention is to provide a headrest for an automotive seat whose displaceable, occupant-engaging contact portion becomes locked at or near the maximum forward position in the event of a rear collision of a sufficient magnitude.

It is a further object of the invention to provide a vehicle seat including a movable headrest featuring a simple construction with reliable functioning and simple operability.

Yet another object of the invention is to provide a headrest for an automotive seat whose occupant-engaging contact portion may be selectively displaced, relative to a backrest-mounted base portion, to each of several intermediate forward positions to thereby improve occupant comfort in the absence of a crash condition.

Under the invention, a headrest for a motor vehicle backrest for an occupant seat of a motor vehicle includes a base portion; an occupant-engaging contact portion supported for relative translational movement on the base portion; an articulated spread-lever arrangement linking the base portion and the contact portion and operative to displace the contact portion away from the base portion upon relative rotation of a first link of the arrangement relative to a second link of the arrangement; and a tension spring extending between the contact portion and the base portion and urging the contact portion toward the base portion, whereby rotation of the first link of the arrangement relative to the second link of the arrangement causes a translation of the contact portion relative to the base portion. While the invention contemplates any suitable mechanism for ensuring only relative translational movement of the contact portion away from the base portion, in a preferred embodiment, the base portion includes a track that may be integrally formed, and the contact portion is translated within the track of the base portion.

While the invention contemplates any suitable mechanical or electro-mechanical actuator for effecting the deployment of the contact portion away from the base portion of the headrest, in an exemplary embodiment, a mechanical actuator includes a pressure plate disposed within the backrest frame that tensions a Bowden cable in response to an application of the occupant's body against the backrest. In one exemplary actuator, rearward movement of the pressure plate relative to the backrest frame imparts rotary motion to an eccentric cam to thereby tension the Bowden cable. Another exemplary actuator employs a lever arm which laterally urges the Bowden cable into a corresponding pocket of an adjacent receiving block so as to similarly tension the Bowden cable. One or more tension springs extending between the contact portion and the base portion urge the contact portion toward the base portion. The tension springs further advantageously work to eliminate any associated rattling.

In accordance with another feature of the invention, the headrest includes an overcenter position for the spread-lever arrangement by which the contact portion becomes locked in or near the maximum forward position once the contact portion has been maximally advanced, for example, in response to a rear collision of sufficient magnitude.

In accordance with another feature of the invention, the use of a tensioning Bowden cable and resisting tension springs advantageously permits a partial relative deployment of the contact portion of the headrest, for example, based upon a detected severity of a rear impact or, alternatively, responsive to a secondary input such as a relative height adjustment of the base portion on the seat backrest. Because such a partial deployment will not cause the spred-lever arrangement to lock in an over-center position, a partially-deployed contact portion can advantageously thereafter be returned, under the control of the Bowden cable, to a position proximate to the base portion.

Thus, in another exemplary design, the power adjustment of the relative height of the headrest atop the backrest frame provides a correlative forward displacement of the contact portion relative to the base portion. In such a case, the invention contemplates a partial deployment of the contact portion relative to the base portion in response to such height adjustment, either by virtue of a direct manipulation of the tension applied by the Bowden cable, or through use of a secondary actuating cable.

Other advantages, features, and benefits of the invention will be readily apparent from the following detailed description of a preferred embodiment, when taken in connection with the accompanying Drawings.

DETAILED DESCRIPTION OF THE PREFERRED EMBODIMENT

Figure 1:
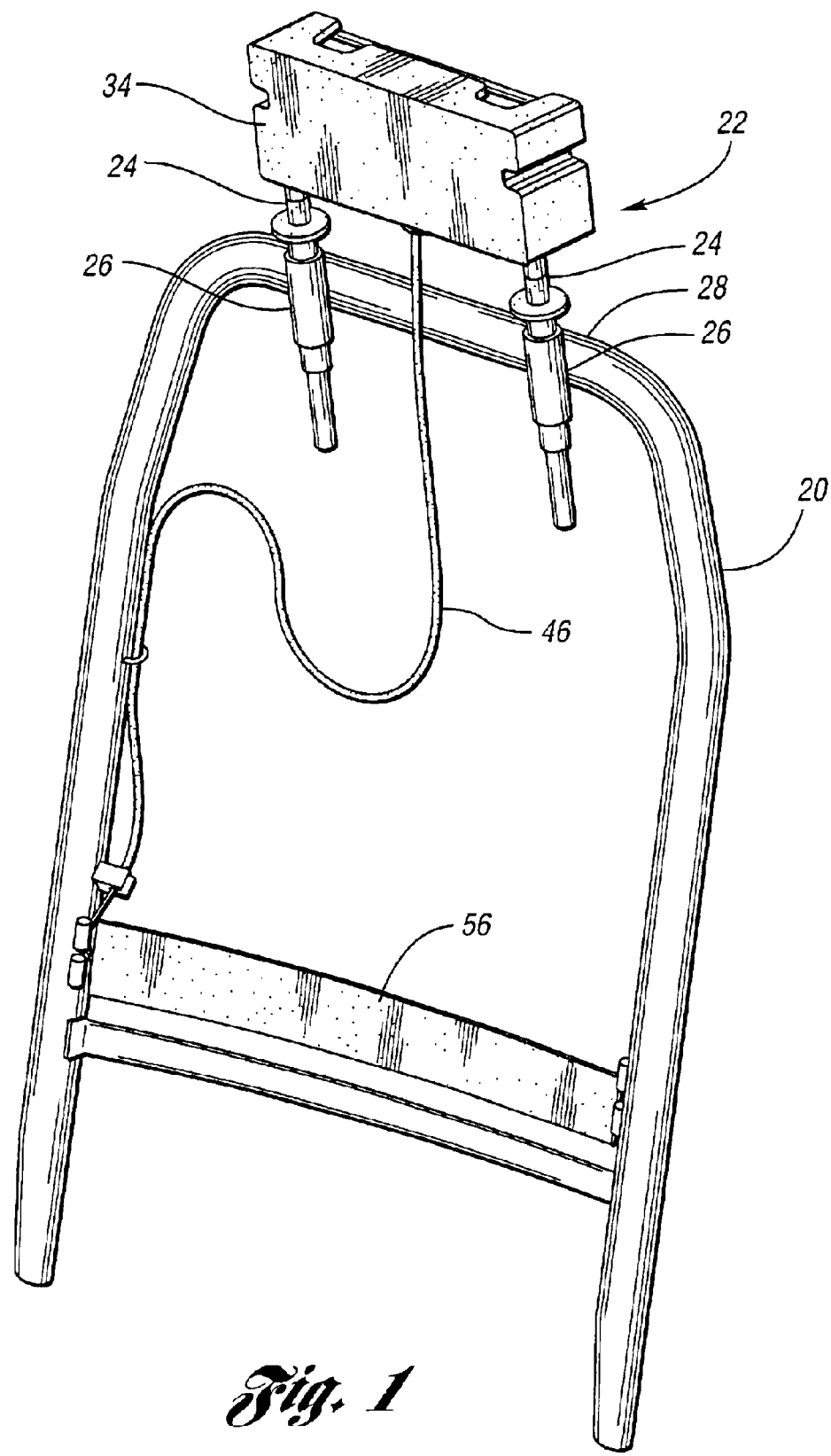
FIG. 1 is a partial view in perspective of a backrest frame for a motor vehicle featuring a head restraint or "headrest" in accordance with the invention.
Figures 2, 3:
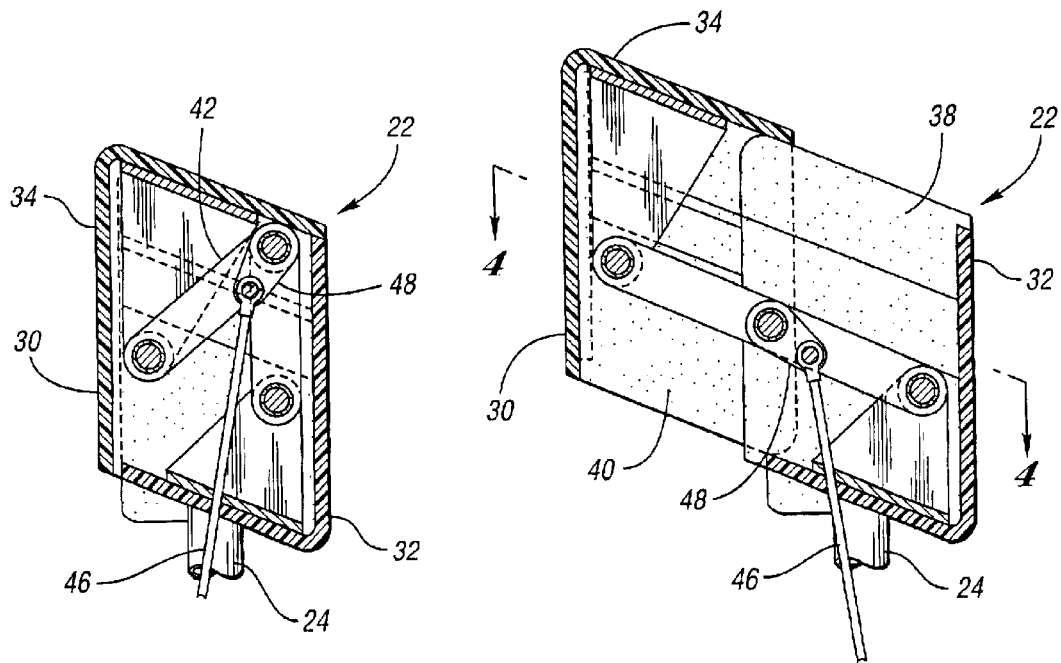
FIG. 2 is a transverse sectional view of the headrest with the contact portion drawn against the base portion, with the tension spring removed for clarity of illustration.
FIG. 3 is a transverse sectional view of the headrest similar to that of FIG. 2, but with the contact portion maximally displaced away from the base portion.

Referring to FIG. 1, an exemplary seat for a motor vehicle in accordance with the invention includes a tubular backrest frame 20 for supporting a backrest cushion (not shown) in a known manner. A headrest 22 is mounted on and substantially supported by the backrest frame 20. By way of example only, as seen in FIG. 1, the headrest 22 may include a pair of downwardly-extending posts 24 that are slidably received in complementary bushings or guides 26 that are secured to the upper portion 28 of the backrest frame 20.

In accordance with an aspect of the invention, the guides 26 on the backrest frame 20 are intended to remain in a substantially fixed position and orientation relative to at least the upper portion 28 of the backrest frame 20, even in the event of a rear collision, and, hence, do not pivot in response to any such collision. The post and guide arrangement advantageously permits nominal vertical adjustment of the headrest 22 relative to the backrest frame 20 to provide greater occupant comfort. As discussed further below, the invention contemplates use of an active mechanism for providing such nominal vertical adjustment of the headrest 22 atop the backrest frame 20.

As best seen in FIGS. 2–5, the headrest 22 includes a two-piece housing 30 formed, for example, of a pair of oppositely-opening generally-cup-shaped halves. The first, relatively-rearward half, coupled in a suitable manner to the upper portions of the posts 24, defines a "base portion 32" that is intended to move in concert with the upper portion 28 of the backrest frame 20 in a rear collision. The second, relatively-forward half defines the occupant-engaging "contact portion 34" of the headrest 22 that is supported on the base portion 32 for relative translational movement on a pair of tracks 36 that, in the exemplary seat 10, are conveniently molded into the opposed, complementary lateral walls 38,40 of the base and contact portions 32,34.

Figure 4:
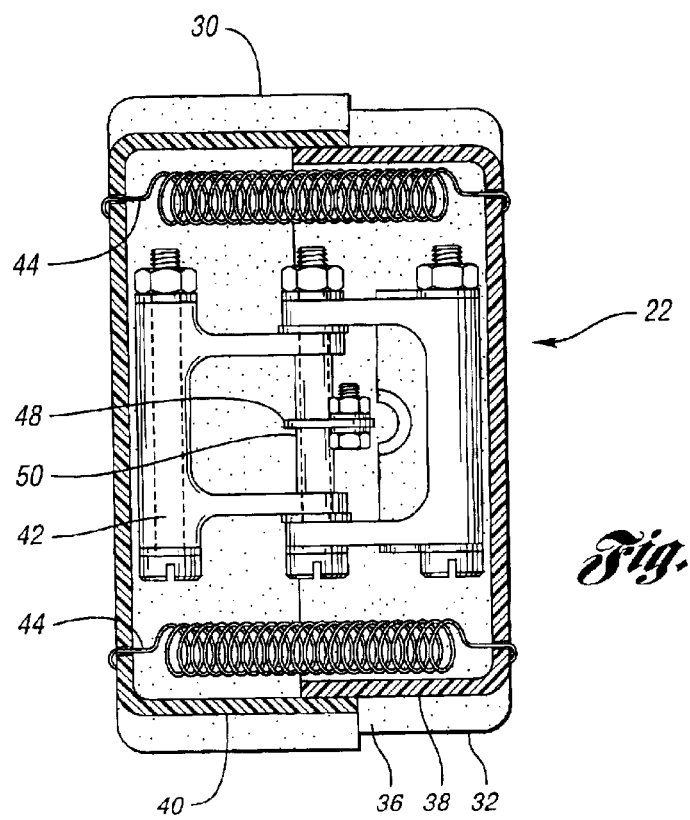
FIG. 4 is a sectional view of the headrest taken along line 4—4 of FIG. 3, further illustrating the tension springs urging the contact portion toward the base portion.
Figure 5:
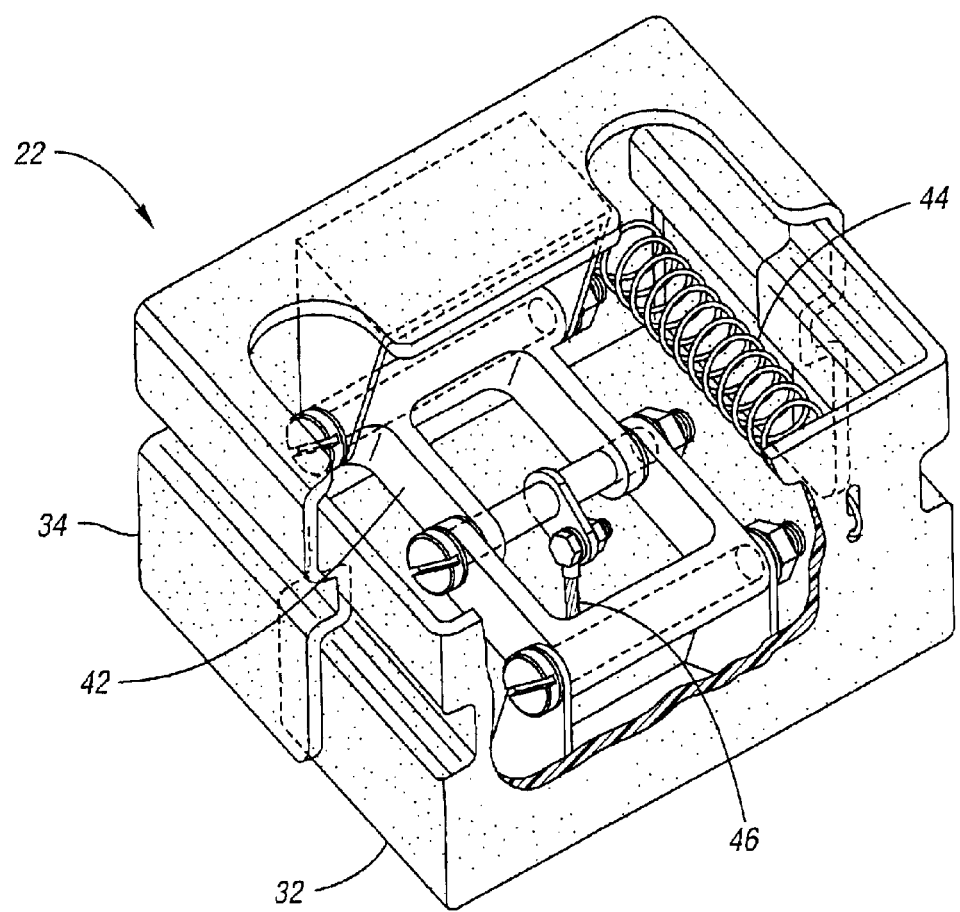
FIG. 5 is a perspective view, partially broken away, of the headrest with the contact portion maximally displaced away from the base portion.

As best seen in FIGS. 4 and 5, an articulated spread-lever arrangement 42 links together the base portion 32 and the contact portion 34, while a pair of tension springs 44 urge the contact portion 34 toward the base portion 32. A Bowden cable 46 is secured by a connecting link 48 to a linkage point 50 of the spread-lever arrangement 42. Thus, upon the suitable tensioning of the Bowden cable 46, the spread-lever arrangement 42 extends to urge the contact portion 34 away from the base portion 32, as resisted by the tension springs 44.

Figures 6, 7:
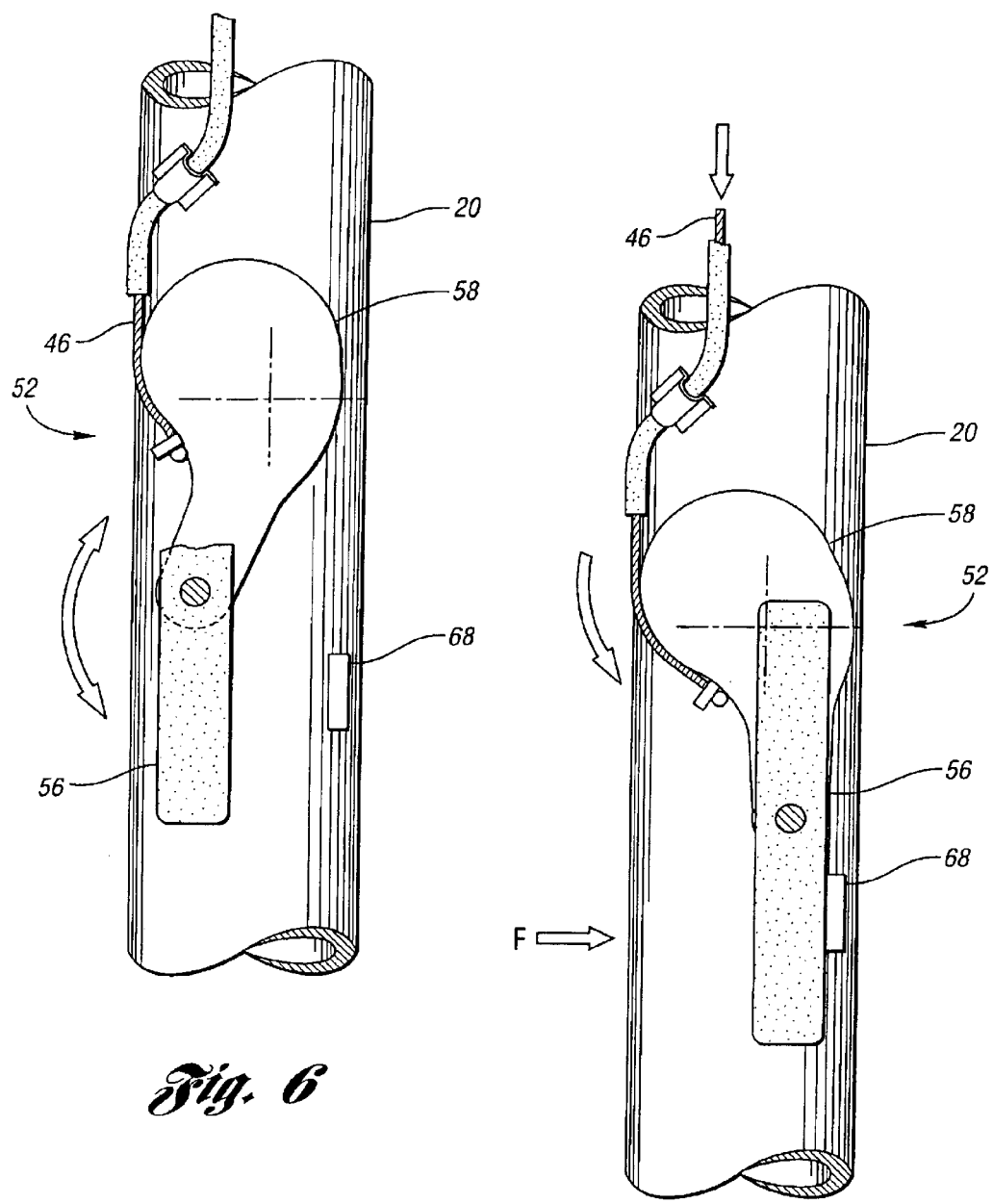
FIG. 6 is a partial view of a first exemplary actuator on the backrest frame for tensioning the Bowden cable.
FIG. 7 is a partial view of the first actuator as an associated pressure plate is displaced rearwardly in the vehicle by a seated occupant.
Figure 8:
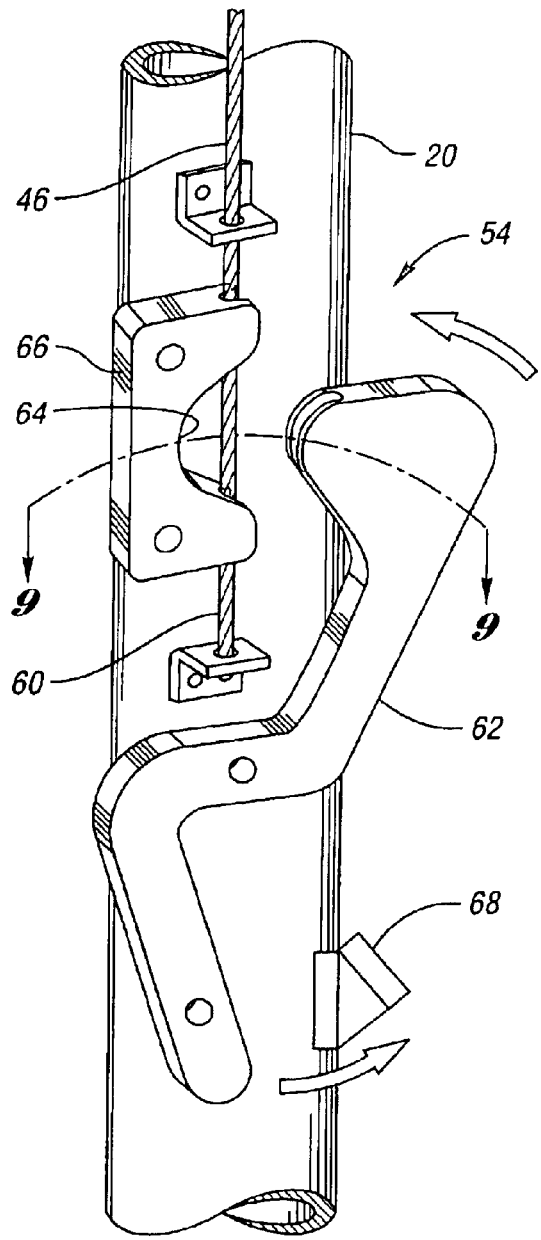
FIG. 8 is a partial view of a second exemplary actuator on the backrest frame for tensioning the Bowden cable.
Figure 9:
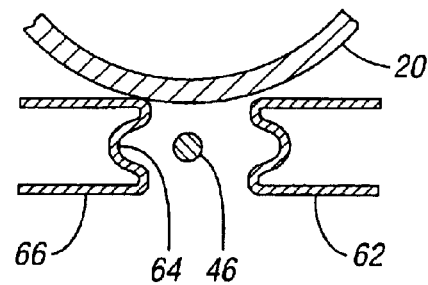
FIG. 9 is a sectional view of the second actuator taken along line 9—9 of FIG. 8.
Figure 10:
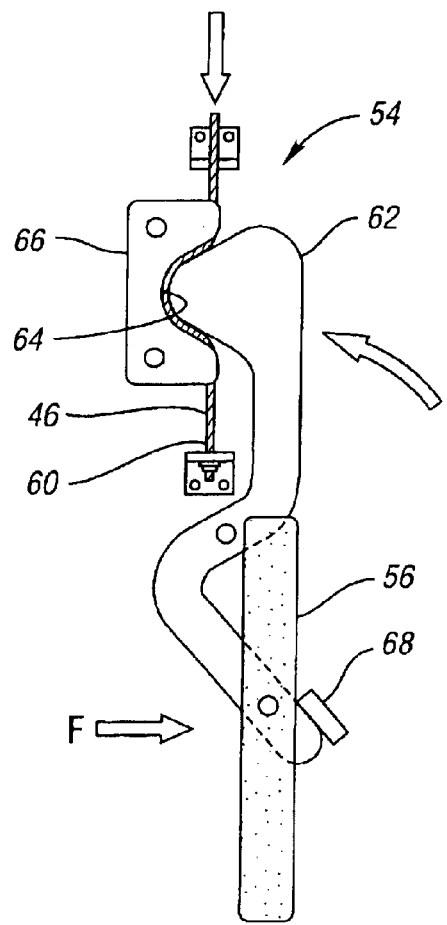
FIG. 10 is a partial view of the second actuator as an associated pressure plate is displaced rearwardly in the vehicle by a seated occupant.

It will be appreciated that the invention contemplates a variety of known trigger mechanisms for tensioning the Bowden cable 46, including those responsive to proximity, crash, and/or crush sensors, whereby the contact portion of the headrest is advanced toward the occupant's head in the event of a rear collision. By way of illustration, a first exemplary mechanical actuator 52 for tensioning the Bowden cable 46 in response to a rear collision is illustrated in FIGS. 6 and 7, while a second exemplary mechanical actuator 54 for tensioning the Bowden cable 46 is illustrated in FIGS. 8–10. Each of these actuators 52,54 is responsive to the application of a force by a seated occupant, generated during a rear collision, against a pressure plate 56 disposed within the seat backrest.

In the first actuator 52, the rearward movement of the pressure plate 56 relative to the backrest frame 20 in response to occupant inertial forces F imparts rotary motion to a cam 58 that is eccentrically mounted on the backrest frame 20, which in turn tensions the Bowden cable 46 that is secured about the cam 58. In the second actuator 54, the bitter end 60 of the Bowden cable 46 is secured to the backrest frame 20, and application by the seat occupant of the force F on the pressure plate 56 serves to pivot a connected lever arm 62 which, in turn, laterally urges a length of the Bowden cable into a corresponding pocket 64 defined in a frame-mounted receiving block 66. In either case, a frame-mounted stop 68 prevents overtravel of the pressure plate 56.

Returning to FIGS. 3–5, in the event of a full forward deployment of the contact portion 34 relative to the base portion 32, the spread-lever arrangement 42 assumes an over-center condition, whereupon the lever arrangement 42 "locks" to thereafter maintain the contact portion 34 at or near a maximally forward position.

Because the contact portion 34 is advanced a forward distance in proportion to degree of cable tensioning, the invention advantageously provides for a partial deployment of the contact portion 34 relative to the base portion 32, either by virtue of a direct manipulation of the tension applied by the Bowden cable, or through use of a secondary actuating cable.

Figure 11:
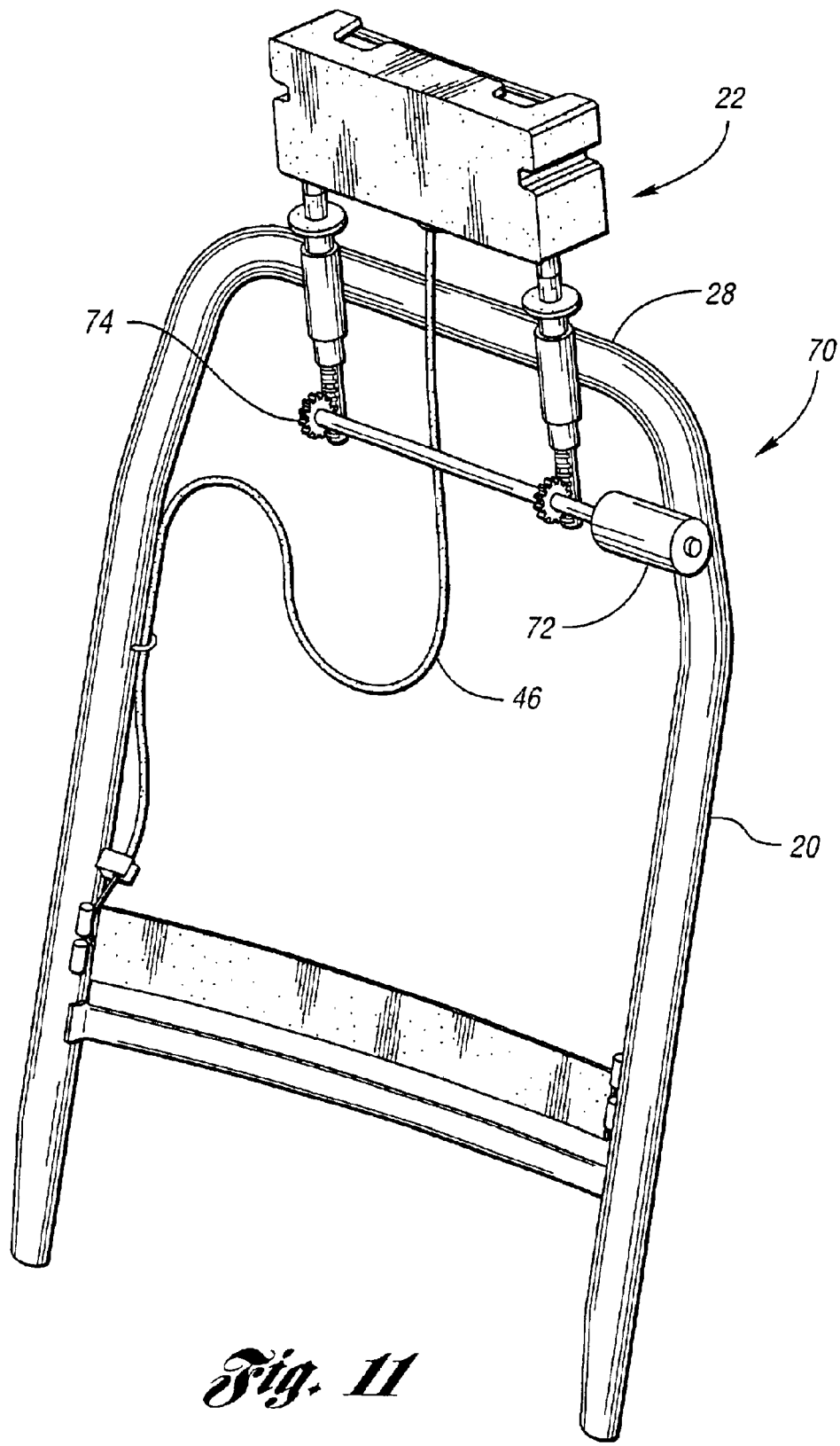
FIG. 11 is a view similar to that of FIG. 1, further illustrating, in schematic, a motor-powered height adjuster for the headrest.

In accordance with another feature of the invention, the headrest 22 is readily adapted for use with a power-height-adjustment mechanism, whereby the relative height of the base portion 32 atop the backrest frame 20 may be adjusted in the absence of a detected crash condition to improve occupant comfort. Thus, as seen in FIG. 11, an exemplary power-height-adjustment mechanism includes a suitable rack-and-pinion or worm drive mechanism mounted on the backrest frame 20 that operates to translate the headrest-supporting posts 24 relative to the frame-mounted guides 26. When the associated electric motor is activated via a corresponding control signal, the motor drives a pair of pinion gears or worm gears to thereby relatively displace each post 24 relative to its respective guide 26.

Such relative height changes of the headrest 22 relative to the top 28 of the backrest frame 20 may advantageously tension the Bowden cable such that the contact portion 34 of the headrest 22 is correspondingly advanced toward the head of the seated occupant upon increasing relative height of the headrest's base portion 32 above the backrest frame 20, as resisted by the attendant elongation of the tension springs, whereby occupant comfort may be yet further improved.

It is noted that either the base portion 32 or the contact surface of the contact portion 34 may be adjustable, for example, as through limited rotation about a secondary horizontal axis (not shown) to thereby provide for a limited manual adjustment of the contact surface's relative inclination within the vehicle. By way of example only, the invention contemplates pivotally mounting the base portion 32 of the headrest 22 on the supporting posts 24 or otherwise pivotally mounting the bracket on the base portion 32 that supports the spread-lever arrangement 42 on the base portion 32, with an electric motor or other suitable actuating/control mechanism being operative to adjust the inclination of the contact surface. Thus adjusted, the invention ensures that the desired angle of inclination is maintained throughout partial and/or full forward deployment of the contact portion 34 of the headrest.

While an exemplary embodiment of the invention has been illustrated and described, it is not intended that the exemplary embodiment illustrate and describe all possible forms of the invention. Rather, the words used in the specification are words of description rather than limitation, and it is understood that various changes may be made without departing from the spirit and scope of the invention. For example, the invention contemplates incorporation of a suitable damping mechanism for damping the motion of an occupant's head as it impinges upon the contact portion during a rear collision, including placement of a damping structure, such as a hydraulic or frictional damping element, between the spread-lever arrangement 42 and one of the base portion 32 or the contact portion 34.

What is claimed is:

1. A backrest for an occupant seat of a motor vehicle comprising:

a backrest frame;

a headrest including a base portion supported atop the backrest frame, an occupant-engaging contact portion supported for relative translational movement on the base portion, an articulated spread-lever arrangement linking the base portion and the contact portion and operative to displace the contact portion away from the base portion upon relative rotation of a first link of the arrangement relative to a second link of the arrangement, and a tension spring extending between the contact portion and the base portion urging the contact portion toward the base portion;

an actuator for imparting a rotation of the first link of the arrangement relative to the second link of the arrangement, whereby the contact portion is controllably translated relative to the base portion, the actuator including a Bowden cable operative to impart a rotation of the first link relative to the second link when tensioned; and a cam that is eccentrically mounted on the backrest frame for rotation in response to an occupant inertial force applied against the backrest frame, and wherein the Bowden cable is secured to a surface of the cam such that the Bowden cable is tensioned upon relative rotation of the cam.

2. The vehicle backrest of claim 1, wherein the base portion of the headrest includes a track, and wherein the contact portion of the headrest is translated within the track.

3. The vehicle backrest of claim 2, wherein the track is integrally formed in the base portion.

4. The vehicle backrest of claim 1, wherein the arrangement includes an overcenter condition, whereby the contact portion locks at or near a maximally deployed position away from the base portion upon maximum rotation of the first link relative to the second link.

5. A backrest for an occupant seat of a motor vehicle comprising:

a backrest frame;

a headrest including a base portion supported atop the backrest frame, an occupant-engaging contact portion supported for relative translational movement on the base portion, an articulated spread-lever arrangement linking the base portion and the contact portion and operative to displace the contact portion away from the base portion upon relative rotation of a first link of the arrangement relative to a second link of the arrangement, and a tension spring extending between the contact portion and the base portion urging the contact portion toward the base portion;

an actuator for imparting a rotation of the first link of the arrangement relative to the second link of the arrangement, whereby the contact portion is controllably translated relative to the base portion, the actuator including a Bowden cable operative to impart a rotation of the first link relative to the second link when tensioned, the Bowden cable having a first end secured to the first link and a second end secured to the backrest frame;

a receiving block mounted on the backrest frame, the receiving block defining a pocket; and a lever arm, mounted on the backrest frame for rotation in response to an occupant inertial force applied against the backrest frame, operative to increasingly urge a length of the Bowden cable laterally into the pocket of the receiving block with increasing applied force.

6. The vehicle backrest of claim 5, wherein the base portion of the headrest includes a track, and wherein the contact portion of the headrest is translated within the track.

7. The vehicle backrest of claim 6, wherein the track is integrally formed in the base portion.

8. The vehicle backrest of claim 5, wherein the arrangement includes an overcenter condition, whereby the contact portion locks at or near a maximally deployed position away from the base portion upon maximum rotation of the first link relative to the second link.

* * * * *